United States Patent [19]
Van Vliet et al.

[11] 3,708,511
[45] Jan. 2, 1973

[54] NOVEL Δ-STEROIDS OF THE OESTRANE SERIES

[75] Inventors: Nicolaas Pieter Van Vliet, Rhenen; Jacobus Albertus Maria Peters, Oss, both of Netherlands

[73] Assignee: Organon Inc., West Orange, N.J.

[22] Filed: Jan. 18, 1972

[21] Appl. No.: 218,837

[52] U.S. Cl. .............260/397.5, 260/397.4, 260/999
[51] Int. Cl.............................................C07c 169/08
[58] Field of Search ......./Machine Searched Steroids Primary Examiner—Henry A. French
Attorney—Hugo E. Weisberger

[57] ABSTRACT

The present invention relates to the preparation of novel $\Delta^6$-oestrene compounds, having in 5α-position a hydroxy or hydroperoxy group, which groups may be acylated or alkylated, and which compounds may have an alkyl substituent in 18-position.

These compounds have very strong progestational, ovulation-inhibiting, oestrogenic and pregnancy-maintaining properties.

5 Claims, No Drawings

NOVEL Δ-STEROIDS OF THE OESTRANE SERIES

The invention relates to a process for the preparation of novel Δ⁶-steroids of the oestrane series.

More particularly the invention relates to a process for the preparation of Δ⁶-5α-hydroperoxy (hydroxy)-steroids of the general formula:

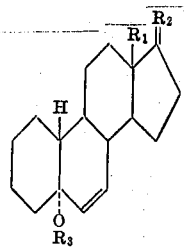

in which $R_1$ = an alkyl group with one to four C-atoms,
$R_2$ = O or (βP) (αQ), in which
P = a free, esterified or etherified hydroxy group,
Q = hydrogen, an alkyl, alkenyl or alkynyl group with one to four C-atoms, and
$R_3$ = a hydroxyl, an alkyloxy or acyloxy group, hydrogen, an alkyl or acyl group.

The compounds according to the invention can be prepared by reacting a steroid of the oestrane series of the general formula:

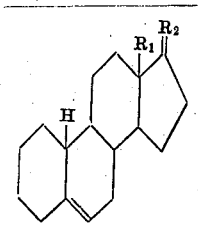

in which $R_1$ and $R_2$ have the meanings indicated above, with activated oxygen, after which the resulting Δ⁶-5α-hydroperoxy-steroid is reduced to the Δ⁶-5α-hydroxy compound, if desired, and/or the substituents required in the 17-position, if lacking, are introduced by any method known per se, and/or the 5α-hydroperoxy or 5α-hydroxy group is esterified or etherified.

The Δ⁵⁽⁶⁾-3-desoxo compounds can be obtained by enol-acylating a Δ⁴-3-keto compound to the corresponding Δ³,⁵⁽⁶⁾-3-acyloxy compound, converting the latter into the Δ⁵⁽⁶⁾-3-hydroxy steroid by selective reduction and hydrolysis, converting the 3-hydroxyl group into a 3-halo or 3-sulphonyloxy group, and finally splitting off the 3-substituent reductively.

By activated oxygen, to be used in the process according to the invention, is meant oxygen in a higher energy-state than the ground-state.

Good results were particularly obtained with singlet oxygen.

The activated oxygen can be obtained by starting from oxygen gas, mixed with another gas, if desired, for example nitrogen, but it is also possible to use compounds that, either by themselves or in combination with other substances, split off the activated oxygen, or are capable of transferring the relative oxygen direct to the compound to be oxygenated Conventional methods for obtaining activated oxygen include a. submitting the reaction mixture, in which oxygen has been dissolved, to the influence of strong rays such as, among others, sunlight;

b. adding a sensitiser to the reaction mixture containing sufficient oxygen, and irradiating the mixture from the visible and/or ultraviolet region. Suitable sensitisers include haematoporphyrine, eosin, methylene blue, Bengal pink, hypericine, fluoresceine and riboflavin;

c. application of a substituted phosphite-ozonide that splits off activated oxygen on heating it above its decomposition temperature. The substituents usually occurring in the phosphite-ozonide are alkyl, aralkyl or aryl groups, in which connection special reference is made to the triphenyl phosphite-ozonide;

d. application of a substituted phosphite-ozonide capable of transferring activated oxygen smoothly bound to the phosphate at a suitable temperature, viz. a temperature below the decomposition temperature;

e. adding to the reaction mixture hydrogen peroxide together with an alkali or alkaline earth hypochlorite, or an alkali or alkaline earth hypobromite.

The oxygenation of the starting product according to the invention is performed in a suitable solvent, e.g. an unsaturated or saturated hydrocarbon including hexane, cyclohexane, pentane and benzene, a substituted saturated or unsaturated hydrocarbon including chlorobenzene, trichloromethane and dichloromethane, a dialkylacylamide including dimethylformamide and diethylacetamide, an ether including diethyl ether, dioxane and tetrahydrofuran, an alcohol including ethanol and methanol, a heterocyclic compound including pyridine and pyperidine, or a mixture of these liquids.

The reaction temperature is not tied to strict limits. On radiating the mixture where a sensitiser is employed, the oxygenation reaction is usually performed at room temperature. If the activated oxygen s obtained by using compounds capable of splitting off this oxygen, or transferring it, the temperature will on the whole be lower, dependent upon the compounds chosen.

Dependent upon the reaction conditions, it is also possible to obtain besides the desired Δ⁶-5α-hydroperoxy-steroid, the Δ⁵-7α-hydroperoxy-steroid as a by-product. The latter compound can under suitable conditions, e.g. by leaving it to stand for some time in an organic solvent such as chloroform, be converted into the desired Δ⁶-5α-hydroperoxy-steroid The Δ⁶-5α-hydroperoxy-steroid obtained by the process according to the invention can be esterified or etherified, if desired, by any method known per se, as indicated hereinafter for the 5α-hydroxy and 17-hydroxy substituents.

The reduction of the 5α-hydroperoxy group to the 5α-hydroxy group can be performed by any reduction method known per se, e.g. by a reduction with an alkali metal aluminum hydride such as lithium aluminum hydride, a reduction with a trialkyl phosphite such as triethyl phosphite, a reduction with an alkali metal sulphite or alkali metal bisulphite such as sodium bisulphite, a reduction with an alkali metal iodide such as sodium iodide, or a reduction with hydrogen in the presence of a suitable catalyst such as palladium/barium sulfate.

The alkyl group present in the 13-position is preferably a lower alkyl group like a methyl, ethyl, propyl, butyl, isopropyl or isobutyl group.

The substituents in the 17-position may already be present in the starting product, but they may also be introduced in the 5α-hydroperoxy stage, or in the 5α-hydroxy stage.

For the introduction of a 17-alkyl, 17α-alkenyl, or 17α-alkynyl group the 17-keto compound is condensed with a metal derivative of such a hydrocarbon. The 17-keto-compound is obtained by oxidizing the 17β-hydroxy-steroid, usually by the Oppenauer method, or with chromium trioxide.

The metal derivative may be a Grignard compound, e.g. the magnesium bromide of the hydrocarbon to be introduced. A special performance thereof for the preparation of a 17β-hydroxy-17α-alkynyl compound consists in that the 17-keto-steroid is reacted with a triple unsaturated hydrocarbon in the presence of an alkali metal compound, such as an alkali metal amide or an alkali metal alcoholate. The introduction of the 17α-hydrocarbon can also take place in two stages: the substance may first be alkynylated and then reduced to the desired alkenyl or alkyl compound. The hydrocarbon radical present in the final products in the 17α-position may be for example a methyl, ethyl, propyl, butyl, vinyl, propenyl, allyl, methallyl, ethynyl, propargyl, butynyl, butadienyl, butadiynyl, or isopropyl radical.

The 17β-hydroxyl group may be esterified or etherified, if desired. In the esterification inorganic acids such as phosphoric acids, or saturated or unsaturated organic acids with one to 18 C-atoms inclusive can be employed. The preparation of these esters can take place by any method known per se by reacting the 17-hydroxy-steroid with the acid anhydride or acid halide thereof, or by reacting the reaction product obtained in the condensation of the 17-keto-steriod with a metal derivative of an unsaturated hydrocarbon radical with the relative acid derivative, without previous hydrolysis.

It is to be preferred to employ those methods for the esterification and/or etherification which are performed under non-acid conditions, as otherwise the possibility of the formation of diene, attended with the splitting off of the 5α-hydroxy, or the 5α-hydroperoxy group becomes greater.

Examples of organic carboxylic acids to be used in the esterification: formic acid, acetic acid, propionic acid, butyric acid, valeric acid, capric acid, undecylic acid, lauric acid, tridecylic acid, myristic acid, pentadecylic acid, oleic acid, palmitic acid, stearic acid, trimethyl acetic acid, diethyl acetic acid, herahydrobenzoic acid, cyclopentyl propionic acid, cyclohexyl butyric acid, cyclohexyl propionic acid, phenyl propionic acid, phenylbutyric acid, malonic acid, succinic acid, glutaric acid, pimelic acid and tartaric acid.

The 17β-ether group may be derived from an aliphatic, aromatic, araliphatic, or heterocyclic hydrocarbon. Dependent upon the reaction conditions and the nature of the 17β-hydroxyl group (secondary or tertiary) the 5α-hydroxyl group can be esterified or etherified, if required. Under certain conditions it is also possible to perform this esterification or etherification in two steps, through which various ester, or ether groups can be introduced into the 17- and 5-positions.

An especially important group of compounds is the group of the general formula:

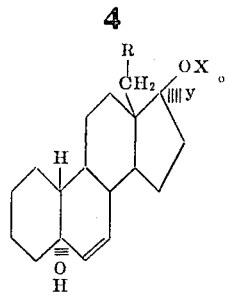

in which

X = hydrogen, or an acyl group with one to 18 C-atoms,
Y = an alkyl, alkenyl or alkynyl group with one to four C-atoms,
R = hydrogen or a methyl group.

The new compounds according to the invention have proved to be very valuable on account of their strongly progestative, ovulation inhibiting, pregnancy maintaining and oestrogenic activities. Especially valuable is the combination of ovulation inhibiting an oestrogenic activity in one compound, because such a compound can replace the two active components of the conventional contraceptives.

The compounds according to the invention can be administered parenterally or orally in the form of suspensions, solutions, emulsions, or solid pharmaceutical dosage units, such as tablets, pills and coated tablets, usually after being mixed with auxiliaries, and with other active components, if desired.

The invention is illustrated by the following examples:

EXAMPLE I 10 grams of $\Delta^5$-17β-hydroxy-17α-ethynyl-oestrene were dissolved in 400 ml of pyridine, to which 80 mg of haematoporphyrine were added. While stirring oxygen gas was bubbled through the solution The temperature was kept at about 20° C. After irradiating with ultraviolet light for 2 hours by means of a water-cooled lamp (Philips 125 W, type 57236/E 70), placed in the reaction mixture, this reddish brown mixture was concentrated in vacuum. Then the concentrate was dissolved in benzene and treated with activated carbon. After filtration the filtrate was evaporated to a yellow oil. This oil was diluted a little with ethanol and poured into ice-water. The diluted oil was recrystallised from methanol to obtain 7.0 gm of $\Delta^6$-5α-hydroperoxy-17β-hydroxy-17α-ethynyl-oestrene; m.p. 141°–143° C; $[\alpha]_D = -24°$ (CH$_3$OH).

Of the $\Delta^6$-5α-hydroperoxy compound 6.3 gm were dissolved in 100 ml of chloroform and shaken for 10 minutes with a solution of 7.5 gm of sodium bisulphite in 50 ml of water. The chloroform layer was washed in water a few times and then dried on sodium sulphate. The solvent was evaporated off, after which the residue was chromatographed over silicagel with benzene/ethyl acetate (8:2) as an eluent to obtain after recrystallising from diisopropyl ether a total quantity of 4.2 gm of $\Delta^6$-5 α,17β-dihydroxy-17α-ethynyl-oestrene; m.p. 212°–215 ° C., $[\alpha]_D = -73°$ (CHCL$_3$).

In the same manner the $\Delta^5$-17β-hydroxyl-17α-ethyl-oestrene and the $\Delta^5$-17β-hydroxy-17α-ethynyl-18-methyl-oestrene were converted into their respective $\Delta^6$-5$\alpha$-hydroperoxy compounds which, in turn, were reduced, as described, to the $\Delta^6$-5$\alpha$,17$\beta$-dihydroxy-17$\alpha$-ethyl-oestrene and the $\Delta^6$-5$\alpha$,17$\beta$-dihydroxy-17$\alpha$-ethynyl-18-methyl-oestrene.

EXAMPLE II $\Delta^5$-17$\beta$-hydroxy-17$\alpha$-ethynyl-oestrene (1.4 gm) was dissolved in methylene chloride (70 ml). While bubbling through air continuously, the mixture was exposed to sunlight for 14 24-hour periods. Then the mixture was evaporated to an oil. After chromatography over silicagel with benzene/ethyl acetate (8:2) as an eluent, a little $\Delta^6$-5$\alpha$-hydroperoxy-17$\beta$-hydroxy-17$\alpha$-ethynyl-oestrene was obtained; m.p. 141°–143° C.

EXAMPLE III

Five grams of $\Delta^5$-17-keto-oestrene were dissolved in 500 ml of chloroform, to which 37.5 mg of haematoporphyrine were added. While stirring, oxygen gas was bubbled through the mixture. The mixture was irradiated for 16 hours with a 500 W tungsten lamp, which was mounted at a distance of 5 cm from the glass reaction vessel. The temperature of the reaction mixture was kept at about 20° C. After the reaction the mixture was treated with activated carbon, filtered off and concentrated. The concentrate was chromatographed over silicagel with benzene/ethyl acetate (8:2) as an eluent to give first $\Delta^6$-5$\alpha$-hydroperoxy-17-keto-oestrene and then $\Delta^{5(6)}$-7$\alpha$-hydroperoxy-17-keto-oestrene.

Two grams of the thus obtained $\Delta^6$-5$\alpha$-hydroperoxy-17-keto-oestrene were dissolved in a mixture of 10 ml of ethanol and 4 ml of tetrahydrofuran. Then 1.3 ml of triethylphosphite were added at 0° C., after which the mixture was stirred at room temperature for 1 hour.

The reaction was decompassed with 3.5 ml of water and 3.5 ml of 30 percent hydrogen peroxide. The reaction mixture was stirred for 1 hour, after which the crystalline precipitate was filtered off, and the filtrate extracted with methylene chloride.

The methylene chloride was dried and concentrated. The residue was chromatographed over silicagel with benzene/ethyl acetate as an eluent (8:2) to obtain 0.9 gm of $\Delta^6$-5$\alpha$-hydroxy-17-keto-oestrene in total; m.p. 1470–150°C.

EXAMPLE IV

Two grams of $\Delta^{5(6)}$-7$\alpha$-hydroperoxy-17-keto-oestrene were dissolved in chloroform. The mixture was kept at room temperature for 6 24-hour periods, after which the solution was evaporated off. The residue was chromatographed over silicagel with benzene/ethyl acetate (8:2) as an eluent to obtain $\Delta^6$-5$\alpha$-hydroperoxy-17-keto-oestrene.

EXAMPLE V

In 50 ml of methylene chloride 15.5 gm of triphenyl phosphite were dissolved at −78° C. ozon was bubbled through the solution for 2 hours. The blue solution was decolourized by bubbling through nitrogen gas, which removed the excess of ozon. Then a solution of 5.0 gm of $\Delta^5$-17$\beta$-hydroxy-17$\alpha$-ethynyl-oestrene in 20 ml methylene chloride were added. The reaction mixture was kept at −35° C. for 3 hours, and then the temperature was raised to 0° C. over a period of 10 hours. After evaporation of the solvent the residue was chromatographed over silicagel with benzene/ethyl acetate (8:2) as an eluent, to obtain $\Delta^6$-5$\alpha$-hydroperoxy-17$\beta$-hydroxy-17$\alpha$-ethynyl-oestrene; m.p. 141°–143° C.

EXAMPLE VI

For 2 hours acetylene was bubbled through a solution of 2.0 gm of potassium tertiary butylate in 25 ml of tetrahydrofuran; the temperature was kept at 0° C. The solution was cooled down to −10° C., after which a solution of 2.0 gm of $\Delta^6$-5$\alpha$-hydroperoxy-17-keto-oestrene, in 20 ml of tetrahydrofuran, was added dropwise. Then again acetylene was bubbled through the solution for 4 hours, after which the mixture was poured into ice-water. The precipitate was washed with water, dried and recrystallised from methanol to obtain 1.8 gm of $\Delta^6$-5$\alpha$-hydroperoxy-17$\beta$-hydroxy-17$\alpha$-ethynyl-oestrene; m.p. 141°–143°C; $[\alpha]_D = -24°(CH_3OH)$.

In a corresponding manner the 17-keto-compound was converted into the 17$\beta$-hydroxy-17$\alpha$-methyl-, and 17$\beta$-hydroxy-17$\alpha$-alkyl-compounds by reacting the 17-keto-compound with the relative Grignard derivatives.

EXAMPLE VII

Three grams of $\Delta^6$-5$\alpha$,17$\beta$-dihydroxy-17$\alpha$-ethynyl-oestrene were dissolved in 90 ml of ethyl acetate, and hydrogenated with hydrogen, using palladium/barium sulphate as a catalyst. After 2 mol of hydrogen had been taken up the catalyst was filtered off, and the filtrate evaporated. Chromatography over silicagel with benzene/ethyl acetate (8:2) gave the $\Delta^6$-5$\alpha$,17$\beta$-dihydroxy-17$\alpha$-ethyl-oestrene; m.p. 175°–178° C.; $[\alpha]_D = -34°(CHCL_3)$.

In the same manner the $\Delta^6$-5$\alpha$,17$\beta$-dihydroxy-17$\alpha$-ethynyl-18-methyl-oestrene, obtained according to example I, was reduced to the corresponding 17$\alpha$-ethyl compound.

EXAMPLE VIII

8 Grams $\Delta^5$-17$\beta$-hydroxy-17$\alpha$-ethynyl-oestrene-17$\beta$-acetate were dissolved in 600 ml pyridine, to which 0.12 g haematoporphyrine were added. While stirring, oxygen was led through at a temperature of about 20° C. The mixture was irradiated with a water-cooled lamp (Philips 125 W, type 57236/E 70), placed in the reaction mixture leading to a mixture which was concentrated in vacuum at a temperature of 50° C. Subsequently the concentrate was dissolved in 50 ml methanol and at 0° C. 4.8 ml of triethylphosphite was added. The mixture was stirred during 1 hour at room temperature and then 25.6 ml of 15 percent hydrogen peroxide were added. The resulting mixture was poured in water and extracted with ether. The ether extracts were washed with water, dried over sodiumsulphate and evaporated. The residue was chromatographed over 400 gm $SiO_2$ with toluene-ethylacetate (8:2) to obtain $\Delta^6$-5$\alpha$,17$\beta$-dihydroxy-17$\alpha$-ethynyl-oestrene-17$\beta$-acetate; m.p. 142°–144° C.; $[\alpha]_D = -75°$ $(CHCL_3)$.

In the same manner the 17-esters of $\Delta^6$-5$\alpha$,17$\beta$-dihydroxy-17$\alpha$-ethynyl-oestrene and the corresponding 18-methyl-compound were obtained from butyric acid, oenanthic acid, $\beta$-phenyl propionic acid and caproic acid.

We claim:
1. A steroid of the formula:

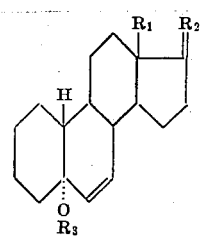

wherein
$R_1$ is an alkyl group having one to four carbon atoms;
$R_2$ is selected from the group consisting of a keto group and the group P ($\alpha$ Q). wherein
  P is selected from the group consisting of a hydroxy group, and an acyloxy group the acyl group of which is derived from an organic carboxylic acid having one to 18 carbon atoms, and
  Q is selected from the group consisting of hydrogen, an alkyl, alkenyl and alkynyl group having one to four carbon atoms,
$R_3$ is selected from the group consisting of hydrogen, an acyl group derived from an organic carboxylic acid having one to 18 carbon atoms, and a hydroxyl group.

2. Novel steroids of the formula:

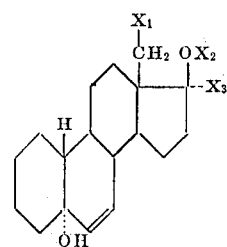

$X_1$ is selected from the groups consisting of hydrogen and a methyl group,
$X_2$ is selected from the group consisting of hydrogen and an acyl group derived from an organic carboxylic acid having one to 18 carbon atoms,
$X_3$ is selected from the group consisting of hydrogen, an alkyl, alkenyl and alkynyl group having 1-4 carbon atoms.

3. $\Delta^6$-5$\alpha$,17$\beta$-dihydroxy-17$\alpha$-ethynyl-oestrene.
4. $\Delta^6$-5$\alpha$,17$\beta$-dihydroxy-17$\alpha$-ethyl-oestrene.
5. $\Delta^6$-5$\alpha$,17$\beta$-dihydroxy-18-methyl-17$\alpha$-ethynyl-oestrene.

* * * * *

UNITED STATES PATENT OFFICE
CERTIFICATE OF CORRECTION

Patent No. 3,708,511      Dated January 2, 1972

Inventor(s) NICOLAAS PIETER VAN VLIET et al.

It is certified that error appears in the above-identified patent and that said Letters Patent are hereby corrected as shown below:

Correct the title of the patent to read: NOVEL $\Delta^6$ - STEROIDS OF THE OESTRANE SERIES.

In the heading of the patent insert:

[32] Priority January 28, 1971

[33] Netherlands

[31] 7,101,102

Signed and sealed this 13th day of November 1973.

(SEAL)
Attest:

EDWARD M. FLETCHER, JR.
Attesting Officer

RENE D. TEGTMEYER
Acting Commissioner of Patents